C. T. MASON.
VENT AND OVERFLOW FOR BATTERIES.
APPLICATION FILED AUG. 21, 1913.
1,107,084.
Patented Aug. 11, 1914.
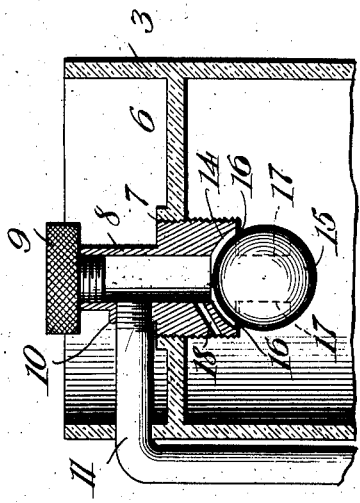
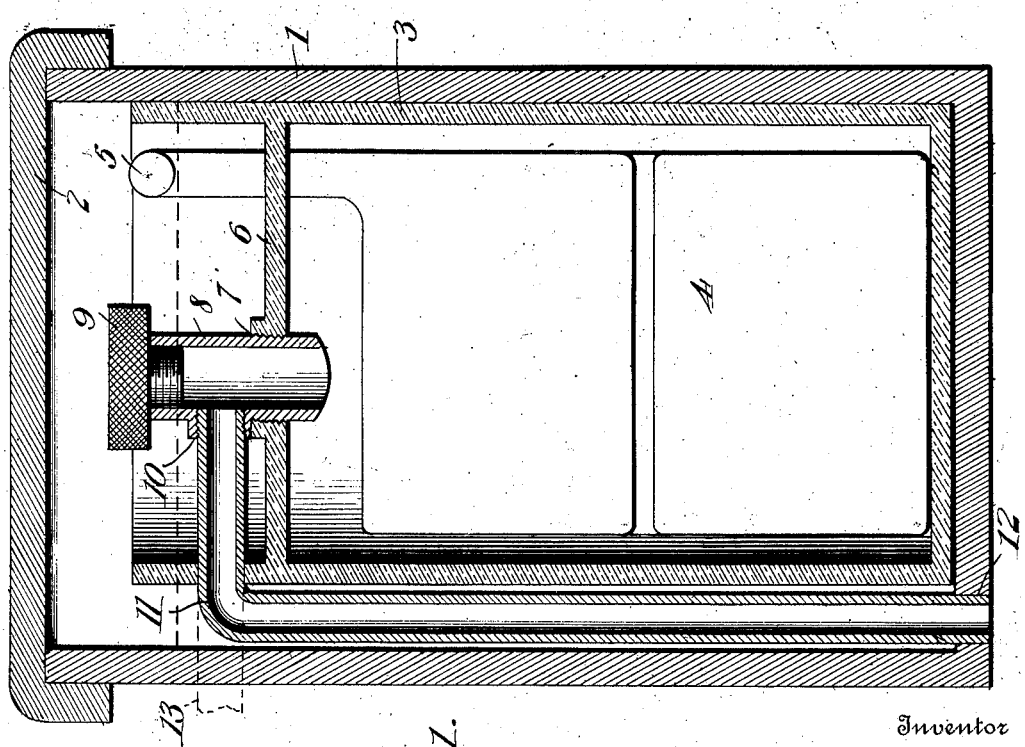

UNITED STATES PATENT OFFICE.

CHARLES THOMAS MASON, OF SUMTER, SOUTH CAROLINA.

VENT AND OVERFLOW FOR BATTERIES.

1,107,084.  Specification of Letters Patent.  Patented Aug. 11, 1914.

Application filed August 21, 1913. Serial No. 785,910.

*To all whom it may concern:*

Be it known that I, CHARLES THOMAS MASON, a citizen of the United States, residing at Sumter, in the county of Sumter and State of South Carolina, have invented certain new and useful Improvements in Vents and Overflows for Batteries, of which the following is a specification, reference being had to the accompanying drawing.

This invention relates to a vent and overflow for battery cells and particularly for secondary, or storage cells.

For many purposes it is customary and, in fact, necessary to inclose a number of cells in a box or casing provided with a tight fitting top or cover. In the upper portion of said box or casing sufficient room is left for the wires leading from the terminals of the cells. These wires are often led from said box or casing through conduits to the parts to which electrical connection is desired to be made. It has become apparent that the gases formed by the section of the battery collect in the upper portion of said box or casing thereby causing serious injury and rapid deterioration to the terminals and the wires, nor does the injury stop here for the gases, seeking an outlet, travel through the conduits when same are used, and attack the wires wherever the insulation permits. Another difficulty experienced is in the refilling of the cells. Because of evaporation and the like it is necessary to frequently add fluid to the cells to keep the plates covered with electrolyte to the proper depth. When the cells are situated in a box or casing, as in an automobile, it is difficult and often impossible to see into them through the small opening in the top and determine the amount of liquid to be added. As a consequence, the solution is often caused to overflow into the box or casing. It is for the purpose of overcoming these defects that the present invention is designed, and while I show same as a part that can be screwed into top of any cell, I do not limit myself to the construction shown, as it is obvious that my invention can be carried out in other ways. For instance the filler top can be located in one opening to the cell, and the vent tube in another. Such modifications I deem within the scope of my invention.

With these and other objects in view, which better will hereinafter more fully appear, my invention consists in the novel construction and arrangement of parts described in the specification and more particularly pointed out in the claims, and which are shown in the accompanying drawings, wherein:—

Figure 1 is a vertical sectional view of a cell equipped with my invention, and the containing box therefor. Fig. 2 is a vertical sectional view of the upper portion of a cell showing a modification of the invention.

Referring to said drawings by numerals, a box or casing 1, of any suitable material, is provided with the tight fitting cover 2, for the purpose of closing the same. Said box 1 is adapted to contain a jar 3, in which are placed, in the usual and well known manner, the plates 4, said plates being immersed in electrolyte contained in the jar 3. Plates 4 are provided with the usual terminals 5, extending above the top or closure of said jar. The top or closure 6, of said jar, is provided with an opening 7, and into said opening is screwed, or otherwise fastened, a filling conduit 8. Said conduit 8 may be of any suitable form and material, but, preferably, it is of cylindrical form. The upper end or mouth of the conduit 8 is threaded interiorly to receive the threaded end of a plug cap or closure 9, which is adapted to seal the said conduit but may be readily removed when it is desired to renew the electrolyte in the cell. The conduit 8 extends downwardly below the top or cover of the jar to a point coincident with the proper level for the electrolyte in said jar. Conduit 8 is provided with an orifice 10, communicating with the hollow interior of said neck, and in the orifice is secured in any suitable manner a small vent and overflow pipe 11. By preference pipe 11 extends at right angles to conduit 8 along the top of the cell to the side thereof at which point it is turned downwardly along the side of the jar and terminated in an opening 12 formed in the base of box 1. This pipe may however, be brought straight across, as shown in the dotted lines at 13, and led through a suitable opening in the side of box 1. As will be readily understood, with this structure the whole may be sealed, as indicated by the dotted line in Fig. 1, with any suitable sealing material.

In the modified form shown in Fig. 2, the same general structure is preserved but the lower end however of conduit is cupped as shown at 14, and adapted to receive and be sealed by a ball float valve 15. Ball 15 may be retained in suitable location in any convenient manner but, as here shown, pins 16 located in the lower rim of cup 14 and extending inwardly engage slots 17 formed in said ball 15. To by-pass the gas when the ball-valve 15 is held in closed position, any suitably located opening may be used but as here shown a small aperture 18 is formed in the lower portion of conduit 8, the diameter thereof being sufficient to allow a ready flow of gas but too small for liquids to gain ready access therethrough. It is to be understood that while the vent 18 will be specifically claimed herein, the invention is not limited to the use of the opening 18 as any alternative and equivalent method of venting the gas may be provided without departing from the spirit of the invention.

As will be readily understood from the foregoing, a ready escape is provided for the gases so that the same cannot come into contact with any portion of the circuit leading from the battery, and at the same time the cells may be filled without the exercise of any great care as a slight overflow can do no injury. It will also be readily understood, that the conduit 8 with its plug and vent and overflow pipe constitute an article of manufacture adapted to be applied to any of the usual and well known jars for battery cells now upon the market.

Having described my invention, what I claim as new and desire to secure by Letters Patent, is:

1. In combination, a secondary cell having a closed top through which its terminals project, a vertically extending filling conduit communicating with said cell through the top thereof and having an opening in its top, and a vent and overflow conduit communicating with the cell through said filling conduit and extending laterally therefrom outside of the cell.

2. In combination, a secondary cell having a closed top through which terminals project, an upstanding filling tube communicating therewith through the top, and a permanently open vent and overflow conduit connected with said filling conduit intermediate its ends exteriorly of said cell and extending laterally over the top to the side and thence downwardly to the bottom thereof.

3. In combination, a secondary cell having a closed top through which its terminals project, a filling conduit communicating with said cell through the top thereof, a permanently open vent and overflow conduit communicating with the cell through said filling conduit and extending laterally therefrom outside of the cell, and a cap normally sealing the top of said filling conduit.

4. In combination, a secondary cell having a closed top through which its terminals project, a filling tube communicating with said cell through the top thereof and having a valve seat formed at its bottom, a float valve coöperating with said seat, and a gas escape aperture extending between the interior of the cell and the filling tube located intermediate the valve and the top of the cell.

5. In combination, a secondary cell having a closed top through which its terminals project, a filling conduit communicating with said cell through the top thereof, a casing for the cell, and a combined vent and overflow conduit connected with said filling conduit, extending laterally therefrom to the side of the cell and then downwardly between the side of the cell and the casing thereof and discharging through the bottom of the casing.

6. In combination a secondary cell having a closed top through which its terminals project, said top having a combined filling and vent opening, a cap normally closing said opening, and a vent and overflow tube extending from said opening below the cap exteriorly of said cell to a point beyond the region of said terminals and outside of said cell.

7. In combination a secondary cell having a closed top through which its terminals project, a combined filling and vent conduit projecting through said top and below the same to a level defining the proper height for the electrolyte within said cell, a cap normally completely sealing the top of said conduit, and a combined vent and overflow tube connected with said conduit below the cap and exteriorly of said cell and extending to a point beyond the region of said terminals.

8. As an article of manufacture a combined filling, overflow and vent device for secondary batteries comprising, a filling conduit, an elongated vent and overflow tube connected therewith intermediate its ends and projecting substantially at right angles thereto, and a cap closing one end of said conduit.

In testimony whereof I hereunto affix my signature in the presence of two witnesses.

CHARLES THOMAS MASON.

Witnesses:
E. W. MOISE, Jr.,
H. R. VAN DEVENTER.